United States Patent [19]

Nakajo et al.

[11] Patent Number: 5,736,835
[45] Date of Patent: Apr. 7, 1998

[54] BATTERY PACK, A CHARGER, AND A METHOD OF DETECTING THE REMAINING CAPACITY OF SECONDARY CELLS

[76] Inventors: Hideki Nakajo; Takeshi Miura; Minoru Doura, all of c/o Sony Corporation, 7-35, Kitashinagawa 6-chome, Shinagawa-ku, Tokyo, Japan

[21] Appl. No.: 697,200

[22] Filed: Aug. 21, 1996

[30] Foreign Application Priority Data

Aug. 31, 1995 [JP] Japan ................................. 7-223449

[51] Int. Cl.$^6$ .............................. H02J 7/00; H01M 10/48
[52] U.S. Cl. ................... 320/43; 320/48; 320/15; 320/17; 320/49; 320/44
[58] Field of Search ......................... 320/43, 44, 48, 320/15, 17, 18, 21, 31, 32, 49

[56] References Cited

U.S. PATENT DOCUMENTS 5,055,763  10/1991  Johnson et al. ........................... 320/15
5,352,968  10/1994  Reni et al. ............................. 320/48 X

FOREIGN PATENT DOCUMENTS

0432690 A  6/1991  European Pat. Off. ........... H02J 7/10

*Primary Examiner*—Peter S. Wong
*Assistant Examiner*—K. Shin
*Attorney, Agent, or Firm*—Limbach & Limbach L.L.P.

[57] ABSTRACT

A battery pack has a current detector, a voltage detector, a temperature sensor, and a CPU. The current detector detects a current flowing in secondary cells. When the current flows in the secondary cells, the voltage detector detects the voltage of the secondary cells, and the temperature sensor detects the temperature of the secondary cells. The CPU calculates the extent of deterioration of the secondary cells. The CPU calculates the remaining capacity of the secondary cells, based on the open voltage of the secondary cells, OCV, obtained by the equation:

$$OCV = DV + K \times DI \times T \times F$$

where DV represents the voltage of said secondary cells when used; DI, a current flowing in said secondary cells; T, the temperature of said secondary cells; F, the extent of deterioration of said secondary cells; and K, a predetermined proportional constant.

6 Claims, 6 Drawing Sheets

| OCV (V) | CAPACITY (Wh) |
|---|---|
| 2.5098 | -2.75 |
| 3.1961 | 3.25 |
| 3.5882 | 9 |
| 3.8039 | 15 |
| 4 | 28.25 |
| 4.2157 | 39 |

FIG. 6

BATTERY PACK, A CHARGER, AND A METHOD OF DETECTING THE REMAINING CAPACITY OF SECONDARY CELLS

BACKGROUND OF THE INVENTION

1. Field of the Invention

This invention generally relates to battery packs, battery chargers, and methods of detecting the remaining capacity of secondary cells. In particular, it relates to a battery pack, a battery charger, and a method of detecting the remaining capacity of secondary cells. The open voltage of the cells is calculated based on the voltage of the cells when used, and based on the calculated open voltage the remaining capacity of the cells is calculated, thereby the remaining capacity can be detected with high precision.

2. Description of the Related Art

Conventionally, the remaining capacity of a battery pack is calculated based on the voltage of secondary cells included in the battery pack, regardless of the condition in which the battery pack is used, which includes both the states when the battery is being charged and when it is being discharged.

SUMMARY OF THE INVENTION

The voltage of secondary cells differs in the states when the secondary cells are used and when not used. In other words, the voltage differs in the states in which a current flows and does not flow in the secondary cells. To find the accurate remaining capacity of the secondary cells, it is necessary to find the voltage of the secondary cells when not used, which is called the open voltage. Conventionally, when the secondary cells are not used, the remaining capacity of the secondary cells can be found with relatively good precision. However, when the secondary cells are used, it is difficult to find the remaining capacity thereof. Accordingly, the battery pack can display only its approximate conditions, such as "battery pack fully charged", "battery pack partly charged", and "charge battery pack" (low battery). It is therefore impossible for the user to know exactly how long the battery pack can be used.

To solve the above problem, the present invention is achieved. It is an object of the present invention to provide a battery pack, a charger, and a method for detecting the accurate remaining capacity of secondary cells even when the cells are used.

In accordance with an aspect of the present invention, the foregoing object is achieved through the provision of a battery pack comprising: secondary cells; voltage detection means for detecting the voltage of the secondary cells when used; open voltage calculation means for calculating the open voltage of the secondary cells, based on the voltage of the secondary cells detected by the voltage detection means; and remaining capacity calculation means for calculating the remaining capacity of the secondary cells, based on the open voltage of the secondary cells calculated by the open voltage calculation means.

The battery pack may further comprise current detection means for detecting a current flowing in the secondary cells, wherein the open voltage calculation means calculates the open voltage of the secondary cells, based on both the voltage of the secondary cells detected by the voltage detection means and the current flowing in the secondary cells, detected by the current detection means.

The battery pack may further comprise temperature detection means for detecting the temperature of the secondary cells, wherein the open voltage detection means calculates the open voltage of the secondary cells, based on both the voltage of the secondary cells detected by the voltage detection means and the temperature of the secondary cells detected by the temperature detection means.

The battery pack may further comprise deterioration detection means for detecting the extent of deterioration of the secondary cells, wherein the open voltage detection means calculates the open voltage of the secondary cells, based on both the voltage of the secondary cells detected by the voltage detection means and the extent of deterioration of the secondary cells detected by the deterioration detection means.

The battery pack may further comprise determination means for determining whether the secondary cells are being charged or not, wherein when the determination means determines that the secondary cells are being charged, the deterioration detection means detects the extent of deterioration of the secondary cells, based on the voltage of the secondary cells changed by cutting off the flow of the charging current.

In another aspect of the present invention, the foregoing object is achieved through the provision of a charger for charging secondary cells, comprising: voltage detection means for detecting the voltage of the secondary cells when used; open voltage calculation means for calculating the open voltage of the secondary cells, based on the voltage of the secondary cells detected by the voltage detection means; and remaining capacity calculation means for calculating the remaining capacity of the secondary cells, based on the open voltage of the secondary cells calculated by the open voltage calculation means.

In accordance with a further aspect of the present invention, the foregoing object is achieved through the provision of a method of detecting the remaining capacity of secondary cells, comprising the steps of: finding the open voltage of the secondary cells, OCV, by using the following equation:

$$OCV = DV + K \times DI \times T \times F$$

where DV represents the voltage of the secondary cells when used; DI, a current flowing in the secondary cells; T, the temperature of the secondary cells; F, the extent of deterioration of the secondary cells; and K, a predetermined proportional constant; and calculating the remaining capacity of the secondary cells, based on the open voltage of the secondary cells, OCV.

DESCRIPTION OF THE PREFERRED EMBODIMENTS

Embodiments of the present invention will be described below.

Figure 1:
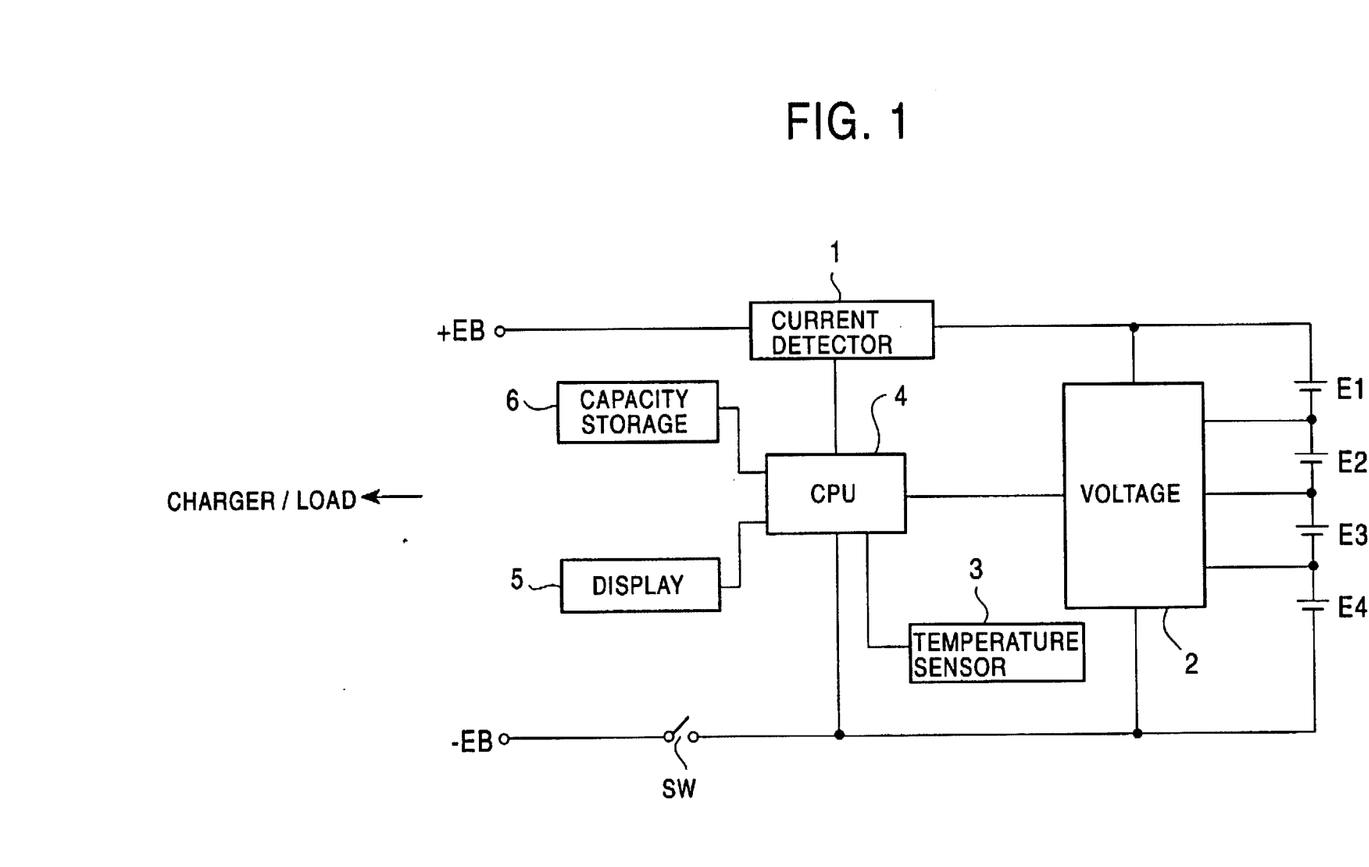
FIG. 1 is a block diagram illustrating a battery pack in accordance with an embodiment of the present invention.

FIG. 1 is a block diagram of a battery pack according to an embodiment of the present invention. This battery pack is called a smart battery or an intelligent battery. It includes a central processing unit (CPU) 4 and other components serving as integrated circuits for monitoring secondary cells E1, E2, E3 and E4, and a current detector 1, all of which detect the condition of the secondary cells E1 to E4, a voltage detector 2, and a temperature sensor 3. The battery pack communicates with a charger or a load such as a computer, connected thereto, and informs the charger or the load of its condition. Terminals, not shown, used for communication with the charger or the load are connected to the CPU 4.

Figure 2:
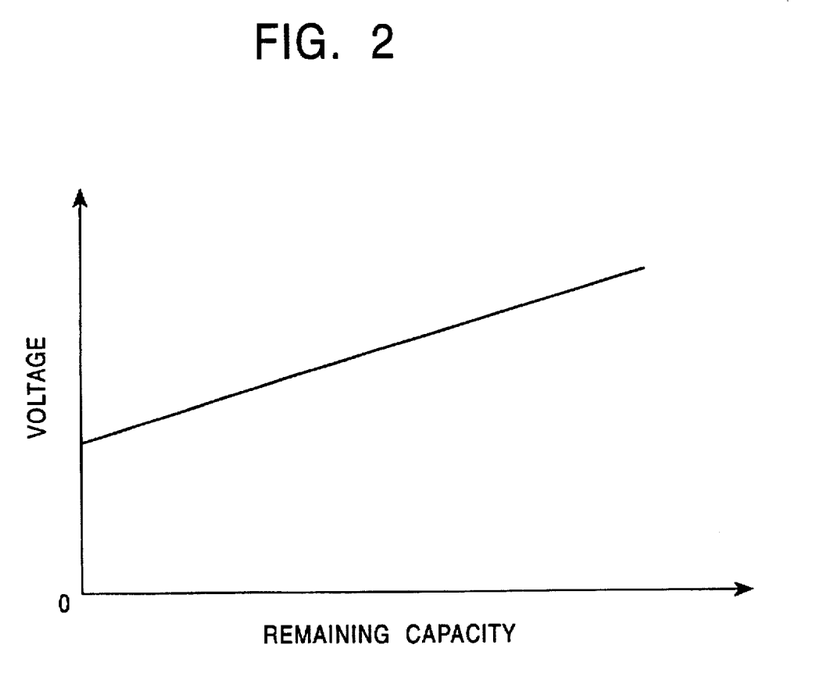
FIG. 2 is a graph showing the relation between the open voltage and the remaining capacity of secondary cells E1 to E4 shown in FIG. 1.

The secondary cells E1 to E4 are connected in series. The positive terminal of the secondary cell E1 is connected to the terminal +EB of the battery pack through the current detector 1. The negative terminal of the secondary cell E4 is connected to the terminal −EB of the battery pack through a switch SW. The secondary cells E1 to E4 includes, for example, lithium or lead cells, which includes carbon. However, the secondary cells E1 to E4 are not limited to such a type of the cells, that is, they may include cells that have characteristics in which their voltage and remaining capacity correspond to each other, as shown in FIG. 2. FIG. 2 shows the relation between the voltage and the remaining capacity in which they are mutually proportional. However, they are not always mutually proportional.

The current detector 1 detects a current (charging current or discharging current) flowing in the secondary cells E1 to E4, and outputs the detected current to the CPU 4. The voltage detector 2 detects the respective voltages (referred to as "cell voltages" hereinafter if necessary) of the secondary cells E1 to E4, and outputs the detected voltages to the CPU 4. The temperature sensor 3 detects the temperature of the secondary cells E1 to E4, and outputs the detected temperature to the CPU 4.

In response to the cell voltages outputted from the voltage detector 2, the CPU 4 turns off the switch SW that is always turned on, so as to prevent the secondary cells E1 to E4 from being excessively charged or discharged. The switch SW includes, for example, a field-effect transistor.

When the battery pack is used, the CPU 4 calculates the open voltage of the secondary cells E1 to E4, as described below, and calculates the remaining capacity of the cells E1 to E4 (battery pack) based on the calculated open voltage.

A display 5 displays the calculated remaining capacity of the battery pack. Capacity storage 6 stores a table showing the correspondence between the open voltage, which is the cell voltage when the battery pack is not used, and the remaining capacity of the secondary cells E1 to E4. This table is referred to as the "remaining capacity correspondence table" hereinafter if necessary. The remaining capacity correspondence table can be obtained by experiment. In other words, the remaining capacity correspondence table can be obtained by measuring the remaining capacity obtained when the secondary cells E1 to E4 have predetermined open voltages.

The current detector 1, the voltage detector 2, and the temperature sensor 3 always operate. Accordingly, the current flowing in the secondary cells E1 to E4, the voltages of the cells, and the temperature of the cells are always outputted to the CPU 4.

The operations of these units will be described below. When the charger (as not shown) is connected to the terminals +EB and −EB, a charging current flows from the charger, through the terminal +EB, the current detector 1, the secondary cells E1 to E4, the switch SW, and the terminal −EB, again to the charger. While the charging current is flowing, the voltage detector 2 detects the respective voltages (cell voltages) of the secondary cells E1 to E4, and outputs the detected cell voltages to the CPU 4. In detail, the voltage detector 2 calculates the potential difference between the positive and negative electrodes of the each secondary cell, and supplies the CPU 4 with the calculated value, e.g., 2.5 to 4.2 V. When the detected cell voltage from the voltage detector 2, outputted to the CPU 4, is greater than or equal to a predetermined voltage (such as a voltage slightly higher than the voltage of the secondary cells when fully charged, e.g., 4.2 V), the CPU 4 regards the secondary cells E1 to E4 as fully charged, and turns off the switch SW. Thereby, the secondary cells E1 to E4 are prevented from being excessively charged.

When a load (as not shown) is connected to the terminals +EB and −EB, a discharging current flows from the secondary cells E1 to E4, through the current detector 1, the terminal +EB, the load, the terminal −EB, the switch SW, again to the secondary cells E1 to E4. While the discharging current is flowing, the voltage detector 2 detects the respective voltages (cell voltages) of the secondary cells E1 to E4, and outputs the detected cell voltages to the CPU 4. When the detected cell voltage from the voltage detector 2, outputted to the CPU 4, is less than or equal to a predetermined voltage (e.g., a voltage, slightly higher than the voltage of the secondary cells when excessively discharged), the CPU 4 turns off the switch SW. Thereby, the secondary cells E1 to E4 are prevented from being excessively discharged.

In this battery pack the remaining capacity of the secondary cells E1 to E4 is always displayed. When the battery pack is not used, the CPU 4 converts the cell voltage supplied from the voltage detector 2 into the corresponding remaining capacity, by referring to the remaining capacity correspondence table stored in the capacity storage 6. Because the cell voltage supplied from the voltage detector 2 is an open voltage, the accurate remaining capacity can be obtained by only referring to the remaining capacity correspondence table.

Subsequently, the CPU 4 uses the display 5 to display the remaining capacity. Accordingly, the displayed remaining capacity is updated in each predetermined period.

Figure 3:
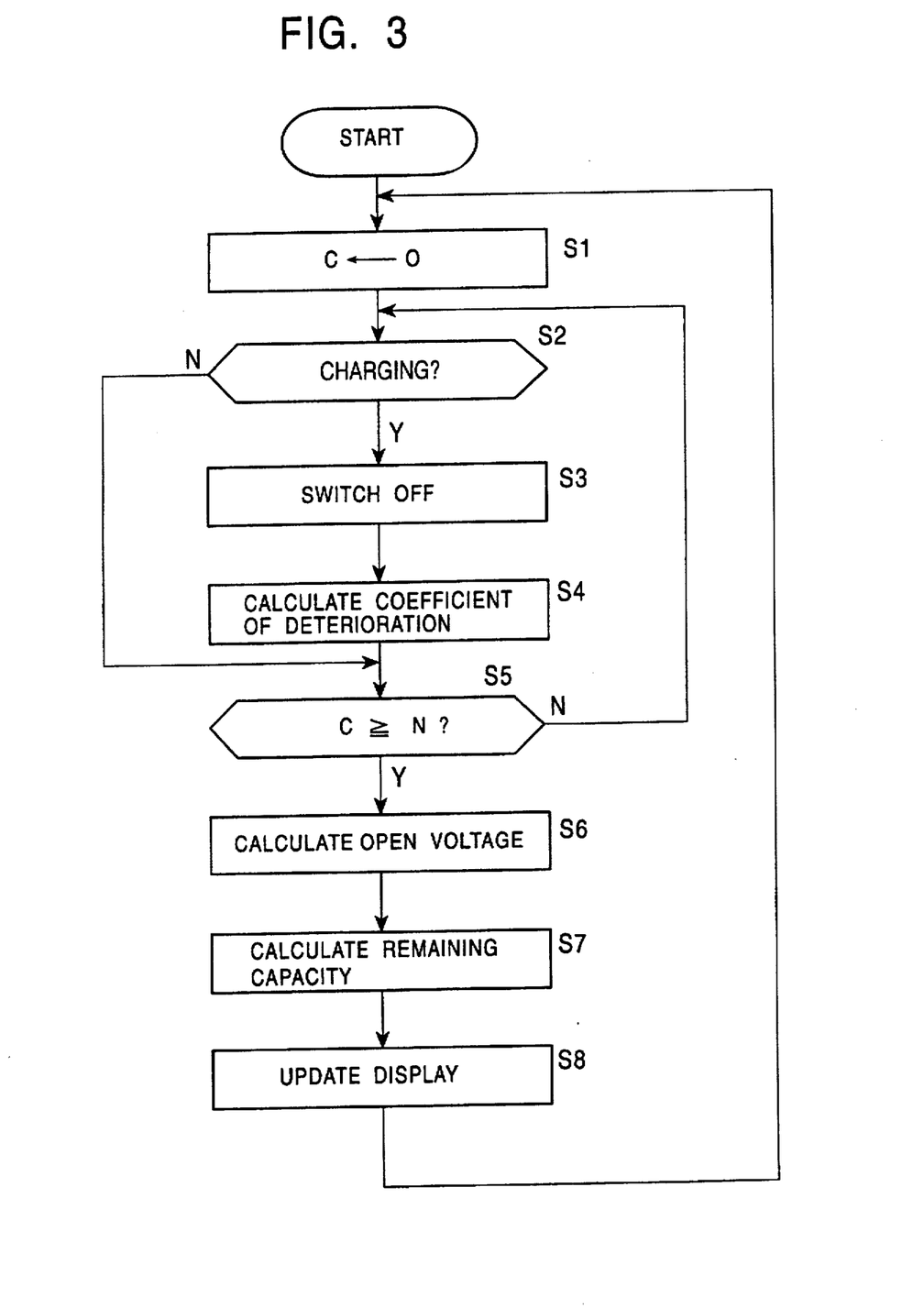
FIG. 3 is a flowchart showing the operation of the battery pack shown in FIG. 1.

On the other hand, when the battery pack is used, a process according to the flowchart shown in FIG. 3 is performed such that the remaining capacity is displayed (updated) in each predetermined period. According to the flowchart, at first, in step S1, an initial value, for example, zero is set to a variable C for measuring the predetermined period. This variable C is sequentially incremented at the timing of a predetermined clock.

In step S2 the CPU 4 determines whether the battery pack is being charged or not. This determination is performed based on the magnitude and direction of the current supplied from the current detector 1. When the CPU 4 determines that the battery pack is being charged, in other words, while a charging current is flowing, the CPU 4 executes step S3. In step S3 the CPU 4 turns off the switch SW, and thereby cutting off the flow of the charging current, before executing step S4. In step S4 the CPU 4 finds a coefficient of deterioration, F, which represents the extent of deterioration of the respective secondary cells E1 to E4, as described below.

As the secondary cells E1 to E4 deteriorate, their internal impedance changes. This change in their impedance appears as the difference between the cell voltage when the charging current flows and the cell voltage when the charging current does not flow. Consequently, the CPU 4 can find a coefficient of deterioration, F, based on the difference between the cell voltages. The difference between the cell voltages can be expressed as the product of the change in the internal impedance and the charging current. When the difference between the cell voltages reaches approximately the double of the difference between the cell voltages in the initial stage, the secondary cells E1 to E4 are considered expired. It is therefore possible to find a coefficient of deterioration by determining by how many times the difference between the cell voltages in the initial stage is multiplied in order to give the detected difference between the cell voltages.

Since the CPU 4 must execute steps S3 and S4 while the battery pack is being charged, a coefficient of deterioration is updated each time the battery pack is charged. In this embodiment the battery pack has the four secondary cells E1 to E4, thus the cells may have different coefficients of deterioration, respectively. Such a case is rather general, so that, for example, a coefficient of deterioration, F, which represents the worst deterioration of one of the secondary cells, is used.

After a coefficient of deterioration is calculated, the CPU 4 turns on the switch SW and executes step S5.

In step S2, when the CPU 4 determines that the battery pack is not charged, it skips over steps S3 and S4 and executes step S5 where it determines whether the variable C is greater than or equal to a predetermined number N, which is an integer corresponding to the above predetermined period. In step S5, when the CPU 4 determines that the variable C is less than the predetermined number N, that is, when the predetermined period does not elapse after the remaining capacity is displayed in step 8 as described below, the CPU 4 returns to execute step S2. The CPU 4 repeats steps S2 through S5 until it determines that the variable C is greater than or equal to the predetermined number N in step S5.

In step 5, when the CPU 4 determines that the variable C is greater than or equal to the predetermined number N, that is, when the predetermined period does not elapse after the previous remaining capacity is displayed, the CPU 4 executes step 6 to calculate an open voltage. The calculation is performed such that the CPU 4 uses the following equation to calculate an open voltage OCV, based on the coefficient of deterioration, F, calculated (detected) in step 4, and a cell voltage DV from the voltage detector 2, a current (charging current or discharging current) DI from the current detector 1, or a temperature T from the temperature sensor 3.

$$OCV = DV + K \times DI \times T \times F$$

where K represents a predetermined proportional constant, which can be found by experiment.

As described above, the open voltage OCV is calculated by considering not only the cell voltage DV but also the current DI, the temperature T, and the coefficient of deterioration, F, all of which are obtained when the battery pack is used. Thus the calculated open voltage OCV is accurate.

After calculating the open voltage OCV, the CPU 4 executes step 7 to calculate the remaining capacity based on the calculated open voltage OCV. In other words, the CPU 4 reads out the remaining capacity corresponding to the open voltage calculated in step 6 from the remaining capacity correspondence table stored in the capacity storage 6. In step 8 the CPU 4 outputs the readout remaining capacity (numerical value) to the display 5, and updates the display of the remaining capacity, which has been displayed, before returning to step 1.

Figure 4:
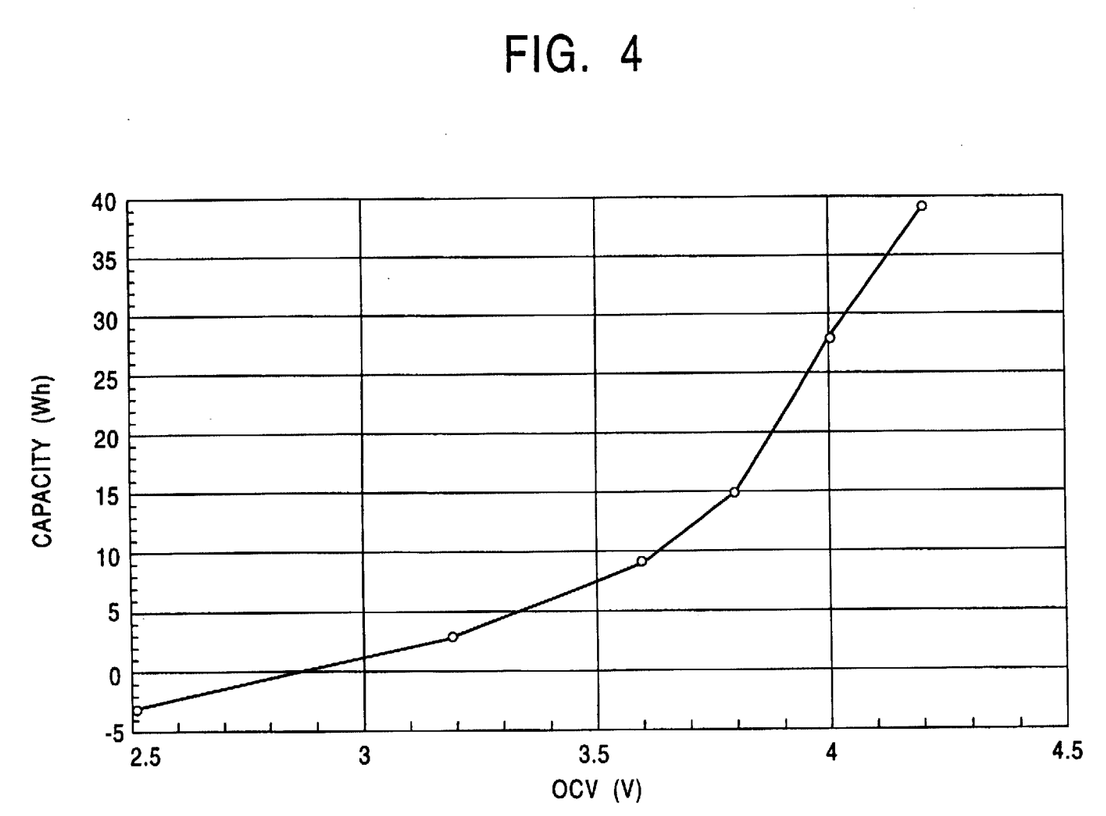
FIG. 4 is a graph showing the relation between the open voltage and the remaining capacity, measured by experiment, of the secondary cells E1 to E4.
Figure 5:
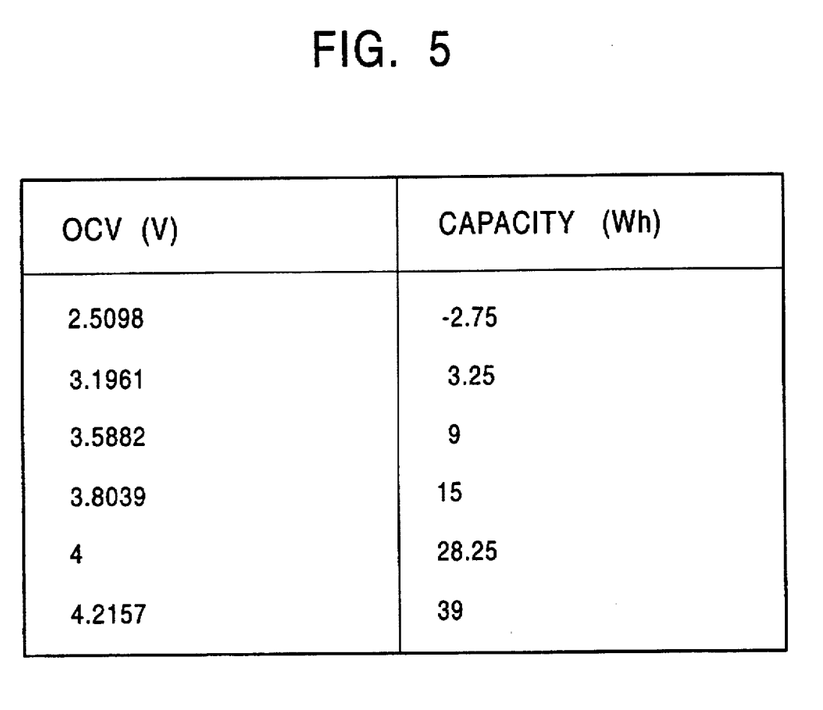
FIG. 5 is an example of a remaining capacity correspondence table stored in capacity storage of the battery pack.

The relation between the open voltage and the remaining capacity is measured in advance by experiment, and the measured relation is shown by a graph in FIG. 4. From the relation shown by the graph in FIG. 4, values (at specified points) shown by a table in FIG. 5 are extracted and stored in the capacity storage 6.

Since the remaining capacity is calculated, based on the accurate open voltage, the calculated remaining capacity is accurate.

Figure 6:
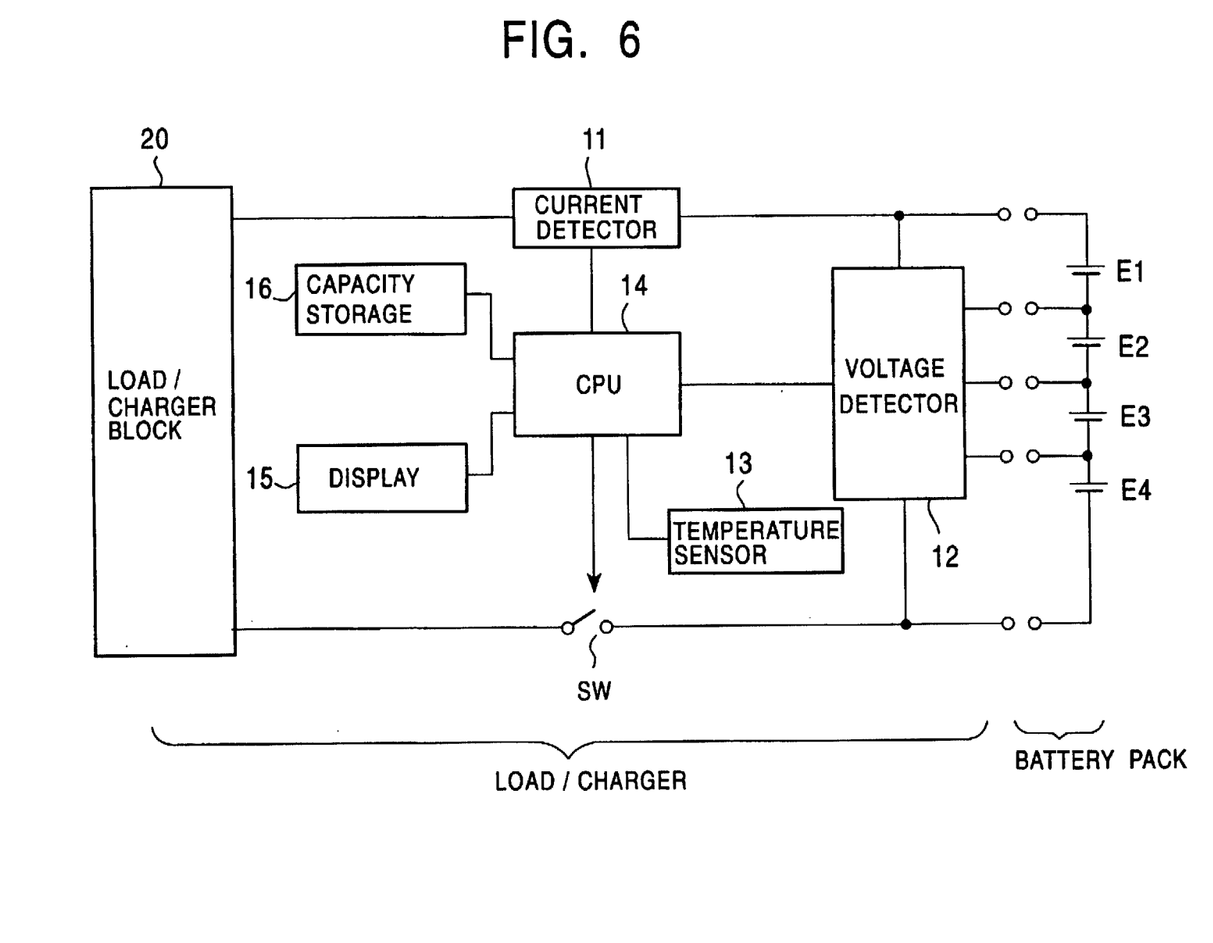
FIG. 6 is a block diagram illustrating a load/charger in accordance with an embodiment of the present invention.

In FIG. 6 there is shown a load/charger in accordance with an embodiment of the present invention. This load/charger includes a current detector 11, a voltage detector 12, a temperature sensor 13, a CPU 14, and a display 15 or capacity storage 16, which have the same structures as the current detector 1, the voltage detector 2, the temperature sensor 3, the CPU 4, and the display 5 or the capacity storage 6, respectively shown in FIG. 1, and a load/charger block 20 that has functions as a general load or charger.

Consequently, when a battery pack including secondary cells E1 to E4 is connected to this load/charger, the accurate remaining capacity of the battery pack can be calculated in accordance with the same manner as that shown in FIG. 1.

The current detector 1, the voltage detector 2, and the temperature sensor 3 are always operated in order that the remaining capacity is always displayed in this embodiment. However, the current detector 1, the voltage detector 2, and the temperature sensor 3 may be operated only when the remaining capacity is displayed according to necessity (e.g., when a predetermined switch, not shown, is turned on), except that the voltage detector 12 needs to be always operated in order that not only the remaining capacity is displayed but also excessive charging and excessive discharging are detected.

When the battery pack is charged a coefficient of deterioration, F, is updated in this embodiment. But it may be updated at other times. Since the switch SW is turned off as described by referring to FIG. 3 when a coefficient of deterioration, F, is updated, a discharging current does not flow when the secondary cells are discharged. Consequently, in order that a coefficient of deterioration, F, is updated when the secondary cells are discharged, the load needs to allow a discharging current to flow.

The four secondary cells are included in the battery pack in this embodiment of the present invention. However, the number of secondary cells is not limited in particular.

What is claimed is:

1. A battery pack comprising:
the at least one secondary cell;
a voltage detection means for detecting the voltage of the at least one secondary cell while the battery pack is connected to a charger or load;
a current detection means for detecting a current flowing in the at least one secondary cell;
an open voltage calculation means for calculating the open voltage of the at least one secondary cell, based on the voltage of the at least one secondary cell detected by the voltage detection means; and
a remaining capacity calculation means for calculating the remaining capacity of the at least one secondary cell, based on the open voltage of the at least one secondary cell calculated by the open voltage calculation means.

2. A battery pack according to claim 1,
wherein the open voltage calculation means calculates the open voltage of the at least one secondary cell detected by the voltage detection means and the current flowing in the at least one secondary cell detected by the current detection means.

3. The battery pack according to claim 1, further comprising a temperature detection means for detecting the temperature of the at least one secondary cell, wherein the open voltage detection means calculates the open voltage of the at least one secondary cell, based on both the voltage of the at least one secondary cell detected by the voltage detection means and the temperature of the at least one secondary cell detected by the temperature detection means.

4. The battery pack according to claim 1, further comprising deterioration detection means for detecting the extent of deterioration of the at least one secondary cell, wherein the open voltage detection means calculates the open voltage of the at least one secondary cell, based on both the voltage of the at least one secondary cell detected by the voltage detection means and the extent of deterioration of the at least one secondary cell detected by the deterioration detection means.

5. The battery pack according to claim 4, further comprising determination means for determining whether the at least one secondary cell is being charged or not, wherein when the determination means determines that the at least one secondary cell is being charged, the deterioration detection means detects the extent of deterioration of the at least one secondary cell, based on the voltage of the at least one secondary cell changed by cutting off the flow of a charging current.

6. A method of detecting the remaining capacity of the at least one secondary cell, comprising the steps of:

finding the open voltage of the at least one secondary cell, OCV, by using the following equation:

$$OCV = DV + K \times DI \times T \times F$$

where DV represents the voltage of the at least one secondary cell when used; DI, a current flowing in the at least one secondary cell; T, the temperature of the secondary cells; F, the extent of deterioration of the at least one secondary cell; and K, a predetermined proportional constant; and calculating the remaining capacity of the at least one secondary cell, based on the open voltage of the at least one secondary cell, OCV.

\* \* \* \* \*

UNITED STATES PATENT AND TRADEMARK OFFICE
CERTIFICATE OF CORRECTION

PATENT NO. : 5,736,835
DATED : April 7, 1998
INVENTOR(S) : HIDEKI NAKAJO ET AL.

It is certified that error appears in the above-indentified patent and that said Letters Patent is hereby corrected as shown below:

Add the following text to the title page:

--[73] Assignee: Sony Corporation
Tokyo, Japan

Signed and Sealed this

Fourth Day of August, 1998

Attest:

BRUCE LEHMAN

Attesting Officer

Commissioner of Patents and Trademarks